United States Patent
Basu et al.

(10) Patent No.: US 9,547,603 B2
(45) Date of Patent: Jan. 17, 2017

(54) I/O MEMORY MANAGEMENT UNIT PROVIDING SELF INVALIDATED MAPPING

(71) Applicant: Wisconsin Alumni Research Foundation, Madison, WI (US)

(72) Inventors: Arkaprava Basu, Madison, WI (US); Mark D. Hill, Madison, WI (US); Michael M. Swift, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 171 days.

(21) Appl. No.: 14/012,261

(22) Filed: Aug. 28, 2013

(65) Prior Publication Data

US 2015/0067296 A1 Mar. 5, 2015

(51) Int. Cl.
*G06F 12/10* (2016.01)
*G06F 12/12* (2016.01)

(52) U.S. Cl.
CPC ....... *G06F 12/1009* (2013.01); *G06F 12/1027* (2013.01); *G06F 12/12* (2013.01)

(58) Field of Classification Search
CPC .......... G06F 12/08; G06F 12/10; G06F 12/12; G06F 12/1009; G06F 12/1027
USPC .................................................. 711/205–207
See application file for complete search history.

(56) References Cited

U.S. PATENT DOCUMENTS

| | | | | |
|---|---|---|---|---|
| 2011/0010502 A1* | 1/2011 | Wang | ................... | G06F 12/121 711/128 |
| 2011/0023027 A1* | 1/2011 | Kegel | ................... | G06F 12/10 718/1 |
| 2014/0068137 A1* | 3/2014 | Kegel | ................. | G06F 12/1009 711/6 |
| 2014/0181461 A1* | 6/2014 | Kegel | ................. | G06F 12/1009 711/207 |

OTHER PUBLICATIONS

O'Neil, E.J., O'Neil, P.E. and G.Weikum, "The LRU-K Page Replacement Algorithm for Database Disk Buffering", Proceedings of the ACM SIGMOD Conference May 1993, Wash. D.C.*
S. Madappa, "Ephemeral Volatile Caching in the cloud", The Netflix Tech Blog, Jan. 27, 2012, http://techblog.netflix.com/2012/01/ephemeral-volatile-caching-in-cloud.html.*
O'Neil et al., "The LRU-K Page Replacement Algorithm for Database Disk Buffering", Proceedings of the ACM SIGMOD Conference May 1993, Wash. D.C.*
Muli Ben-Yehuda, Nadav Amit, Ben-Ami Yassour, Assaf Schuster, Dan Tsafrir, "Rethinking IOMMU Address Translation" [poster], 1st Technion Computer Engineering (TCE) Conference, 2011.*
Nadav Amit et al.; IOMMU: Strategies for Mitigating the IOTLB Bottleneck, Author Manuscript; Published in WIOSCA 2010 Sixth Annual Workshop on the Interaction between Operating Systems and Computer Architecture; WIOSCA 2010; pp. 1-12; US.

(Continued)

*Primary Examiner* — Midys Rojas
*Assistant Examiner* — Tracy A Warren
(74) *Attorney, Agent, or Firm* — Boyle Fredrickson, S.C.

(57) ABSTRACT

A memory management unit for I/O devices uses page table entries to translate virtual addresses to physical addresses.

(Continued)

The page table entries include removal rules allowing the I/O memory management unit to delete page table entries without CPU involvement significantly reducing the CPU overhead involved in virtualized I/O data transactions.

19 Claims, 2 Drawing Sheets

(56) References Cited

OTHER PUBLICATIONS

Nadav Amit et al; vIOMMU: Efficient IOMMU Emulation; Research Paper; pp. 1-14; WIOSCA 2010.
Michael M. Swift et al; Improving the Reliability of Commodity Operating Systems; ACM Journal Name, vol. V, No. N, Month 20YY, pp. 1-33; SOSP 2003: US.

* cited by examiner

I/O MEMORY MANAGEMENT UNIT PROVIDING SELF INVALIDATED MAPPING

STATEMENT REGARDING FEDERALLY SPONSORED RESEARCH OR DEVELOPMENT

This invention was made with government support under 1218323 and 1117280 awarded by the National Science Foundation. The government has certain rights in the invention.

CROSS REFERENCE TO RELATED APPLICATION

BACKGROUND OF THE INVENTION

The present invention relates to a computer architecture and in particular an input-output memory management unit (IOMMU) for controlling mapping between an I/O device address space and physical computer memory reducing both the processor burden and the risks of memory corruption due to erroneous or malicious operation of I/O.

Current electronic computers may include a memory management unit (MMU) positioned between one or more processors and physical memory. The MMU, under the control of the operating system (OS), maps virtual addresses used by the processors to different addresses of physical memory. This mapping, for example, allows fragmented physical memory locations to be presented to a processor (or a particular process running on the processor) as a continuous block of virtual memory. Different processes can use the same address range of virtual memory mapped to different addresses of physical memory.

The MMU also provides for memory protection by isolating given processes to limited virtual memory (and hence a physical memory) regions preventing processes from corrupting memory used by other processes through overwriting of that memory. In this regard, the MMU may track and enforce read/write permissions, limiting reading or writing of a given process within the physical address range allocated to a process.

A similar input-output memory management unit (IOMMU) may be interposed between I/O devices such as disk drives and the physical memory. Like the MMU, the IOMMU provides the I/O devices with virtual addresses (IOVA) that are mapped to physical addresses of the physical memory. The IOMMU may further include permissions limiting the reading and writing within the physical address range allocated to the I/O device and thus may prevent an I/O device from corrupting the memory state of others (CPU, OS or other I/O) or accessing other I/O devices.

The mappings between the virtual addresses (IOVA) and the physical addresses are stored in a data structure called page table, typically resident in physical memory. The page table stores the mapping information at the granularity of one or a few fixed-size pages. Each of the individual entries of the page table is called a page table entry or PTE. A PTE thus stores the mapping of a given page in a virtual address to its corresponding physical address of physical memory. The PTE may also include one or more permission limiting reading and/or writing to the physical memory within the mapped address range.

In operation, an device is typically associated with a driver program that may run on the processor. Before an I/O device can read or write, from or to the physical memory, the corresponding driver program requests the OS to establish the needed mapping between the virtual address and the physical memory. The OS then may create the requested PTEs in the page table to establish the requested mapping.

After the OS establishes table entry on behalf of the driver, the driver invokes the necessary call to the I/O device which performs an I/O task.

When the I/O device needs to access memory as part of the I/O task, it provides a virtual address to the IOMMU. The IOMMU finds a PTE related to that virtual address in the page table to obtain the necessary physical address range and permissions. These mappings and permissions of the page table PTE may be duplicated in a cache structure of the IOMMU called IO Translation Lookaside Buffer (IOTLB). The IOMMU then accesses the physical memory according to that mapping and the permissions of the cached PTE. The IOMMU denies access to physical memory if the mapping or if enough permission for the operation is unavailable.

When the memory access by the I/O device is complete, the I/O device provides a completion signal to the operating system. The operating system executing on the processor then may perform a PTE deletion action, deleting the PTE from the page table, and sends a corresponding IOMMU cache deletion signal to the IOMMU cache causing deletion of the corresponding PTE from the IOMMU cache. This deletion process prevents extra erroneous memory accesses by an errant I/O device such as may corrupt previously written data. The operating system executing through the processor may periodically delete stale PTEs from the page table (even absent a completion signal from the IOMMU) after a predetermined period of time.

The benefits of the IOMMU in virtualization and reduction of memory corruption are offset in part by the additional time required to implement the above described protocol and the demands placed on a processor resources.

SUMMARY OF THE INVENTION

The present inventors have recognized that the processor time required to delete the PTE from the page table and send the IOMMU cache deletion signal can be eliminated for most IOMMU transactions by attaching a "removal rule" to the PTE allowing "self deletion" of the PTE by the IOMMU. The removal rule, for example, may delete the PTE after a predetermined number of memory accesses (typically one) or after a predetermined time. In this way, processor time and resources required for IOMMU transactions may be significantly reduced and the susceptibility of the computer system to I/O device or driver errors (for example in failing to send the completion signal) are reduced.

Specifically then, the present invention provides an IOMMU having input address lines for receiving virtual addresses from an I/O device and output address lines for providing physical addresses to a physical memory as well as data lines for communicating data between the I/O device and the physical memory. A cache memory in the IOMMU called IOTLB, holds at least one page table entry mapping at least one virtual address to at least one physical address.

Translation circuitry receives a given virtual address from the input address lines and, only when an applicable page table entry is present in the memory, the translation circuitry translates the given virtual address to a given physical address at the output address lines according to the applicable page table entry and communicates data on the data lines related to the physical address in a data transaction. Importantly, the applicable page table entry includes a removal rule providing a condition for removal of the applicable page table entry from the translation table and the translation circuitry further removes the applicable page table entry from the memory when the condition is satisfied.

It is thus a feature of at least one embodiment of the invention to reduce post-I/O transaction activity by the processor by allowing the processor to communicate page table entry cleanup rules to the IOMMU at the time of creation of the page table entry, and allowing the IOMMU to invalidate its own page table entries upon completion of the memory transaction.

The translation table may hold multiple page table entries mapping different virtual addresses to different physical addresses. The translation table may be a buffer caching a portion of a page table in physical memory holding multiple page table entries.

It is thus a feature of at least one embodiment of the invention to allow the removal rules to be conveniently communicated from the processor to the IOMMU through physical memory and efficiently cached at the IOMMU.

The IOMMU may further remove the applicable page table entry from the page table.

It is thus a feature of at least one embodiment of the invention to delegate to the IOMMU cleanup activities of the page table in the physical memory eliminating both an additional task otherwise formed by the processor and optionally eliminating the need for post transaction communication between the IOMMU and the processor.

The IOMMU may remove the applicable page table entry from the page table before determining whether the condition is satisfied.

It is thus a feature of at least one embodiment of the invention to consolidate memory accesses to the page table for improved efficiency. In the common case where the page table entry is invalidated after a single memory transaction, no later memory access may be required.

It is a further feature of at least one embodiment of the invention to prevent inadvertent reuse of the page table entry from the page table during a pending I/O memory transaction by deleting it during this transaction.

The translation circuitry may modify the removal rule when writing the page table entry back to the page table in physical memory.

It is thus a feature of at least one embodiment of the invention to store the rule and the rule state indicating whether the rule has been satisfied or not, in the same page table entry for efficient processing.

The IOMMU may include a page table walker for extracting page table entries from the page table in physical memory when the applicable page table entry is not initially found in the IOMMU memory so that the applicable page table entry becomes present in the IOMMU memory.

It is thus a feature of at least one embodiment of the invention to provide a correct test for the existence of an applicable page table entry when the page table entry is not cached by then referring to the page table in physical memory.

Each page table entry may further provide at least one permission indicating at least one of permission to read data from at least one physical address and to write data to at least one physical address.

It is thus a feature of at least one embodiment of the invention to provide a system that integrates with read and write permissions that may be implemented by a memory management unit.

The removal rule condition may be an occurrence of a predetermined number of data transactions using the applicable page table entry. For example, the predetermined number of data transactions may be one.

It is thus a feature of at least one embodiment of the invention to provide a simple rule that can be effectively executed by the IOMMU in a self-contained manner without the need to confer with the processor. The IOMMU has inherent knowledge of occurrence of the memory data transaction.

Alternatively or in addition, the removal rule condition may be an occurrence of a predetermined amount of time for example a time of existence of the applicable page table entry in the translation table or a time since the last reference to the page table entry.

It is thus a feature of at least one embodiment of the invention to provide an alternative removal rule consistent with the current practice of invalidating page table entries in a timely fashion to prevent unintended memory access.

These particular objects and advantages may apply to only some embodiments falling within the claims and thus do not define the scope of the invention.

DETAILED DESCRIPTION OF THE PREFERRED EMBODIMENT

Figure 1:
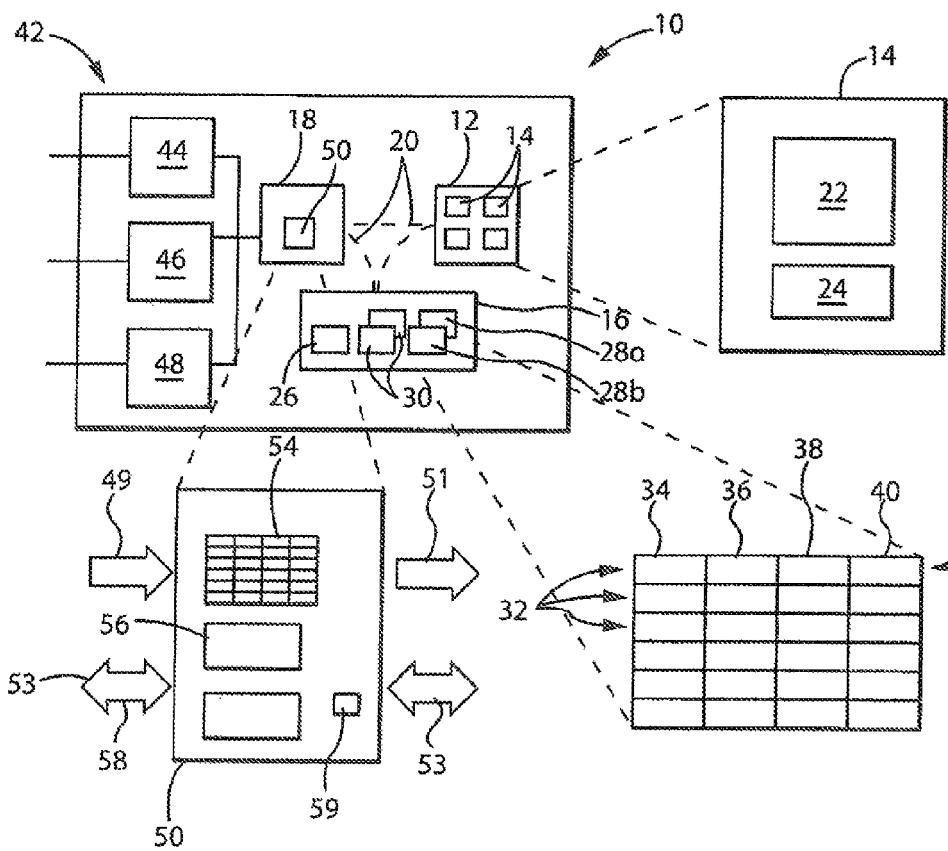
FIG. 1 is a block diagram of a computer system that may employ the IOMMU of the present invention showing an example processor system with a processor having an MMU and multiple I/O devices employing an IOMMU and further showing an IOMMU page table in physical memory incorporating removal rules per the present invention.

Referring now to FIG. 1, a computer 10 suitable for use with the present invention may provide for a processor system 12 including one or more processor cores 14, physical memory 16 and an I/O interface I/O inter-communicating, for example, by means of a bus structure 20. The bus structure may provide a conventional memory bus with address lines and data lines communicating between the processor cores 14 and I/O interface 18 and physical memory 16. The bus structure 20 may also provide a control bus, for example, allowing direct communication of data between the processor system 12 and the I/O interface 18, for example using memory mapped registers.

Each processor core 14 may include a processing unit 22 (CPU) and a memory management unit (MMU) 24 of the type well known in the art. As is understood in the art, each processing unit 22 provides for an arithmetic logic unit and various registers allowing the processing of arithmetic or Boolean instructions obtained from the physical memory 16 and operating on data read from and then written to the physical memory 16.

The MMU 24 provides a mapping between virtual memory locations used by the processing unit 22 and actual physical addresses of the physical memory 16. This mapping process is normally controlled by the operating system 26 also being a program running on the processing unit 22 and is enrolled in a page table (MMU-PT) 28a in the physical memory 16 as written by the operating system 26.

The physical memory 16, for example, may include electronic, solid-state, random-access memory or the like generally operating together to provide for a logical storage area. As is understood in the art, physical memory 16 provides address lines receiving numerical addresses designating memory elements from which data may be read from the physical memory 16 or to which data may be written to the physical memory 16. As noted, the physical memory 16 will generally hold an operating system 26, one or more application programs 30, and an MMU-PT 28*a*.

In addition, the physical memory 16 will hold an IOMMU page table (IOMMU-PT) 28*b*. Here, the IOMMU-PT is depicted as a simple flat table structure for clarity, but often the page table will be a hierarchical or other structure and this depiction is not intended to be limiting. IOMMU-PT 28*b* generally provides for a number of page table entries (PTE) 32 shown as table rows that will hold the index values of a virtual address 34 or virtual address range as each is linked to a physical address 36 or a physical address range to which the virtual address 34 will be mapped. Each PTE 32 also holds permissions 38, for example, to read or write for that address range, and one or more removal rules 40 describing a condition that will provoke deletion of the PTE 32 as discussed below. One type of removal rule 40 provides removal of the PTE 32 after a predetermined number of memory transactions in which the given I/O device 42 accesses memory, typically one. This may be a default state if no removal rule 40 is entered in a give PTE 32. This number of memory transactions is entered at the time of creation of the PTE 32 by the operating system 26.

Another type of removal rule 40 provides for removal of the PTE 32 after a predetermined elapsed time. This time may be the time since its creation in the IOMMU-PT 28*b* or the time that the PTE 32 was last referenced by the IOMMU 50. At the time of generation of the PTE 32, the removal rule 40 will hold a sum of the current time and the interval that will elapse before expiration of the PTE 32 occurs. Other removal rules are possible and these two removal rules 40 may be combined for removal of the PTE 32 upon the first of a given number of memory transactions or the expiration of a time period.

The I/O interface 18 provides an interface with various I/O devices 42 including but not limited to, for example, a disk drive 44, a graphics processing unit 46, and other I/O devices 48 including, for example, Ethernet, USB, and Bluetooth interfaces as understood in the art. The I/O interface 18 may include an IOMMU 50 also providing a mapping between virtual addresses used by the I/O devices 25 and actual physical addresses of the physical memory 16.

IOMMU 50 generally receives virtual addresses 49 from the I/O devices 42 and converts them to physical addresses 51 for use by the physical memory 16. Data for those addresses is exchanged over data lines 53 according to that mapping. For the purpose of the mapping, IOMMU 50 provides an IO translation look aside buffer (IOTLB) 54, serving as a cache for data of the IOMMU-PT 28*b*. In addition, the IOMMU 50 provides a page table walker circuit 56 that may examine the IOMMU-PT 28*b* for relevant entries when one is not found in TLB 54, and a removal rule engine 58 for executing a removal process of stale PTEs 32 from the TLB 54 and the IOMMU-PT 28*b*. In one embodiment, the removal rule engine 58 will include a clock 59 or access to a system clock so that expiration times can be evaluated.

Figure 2:
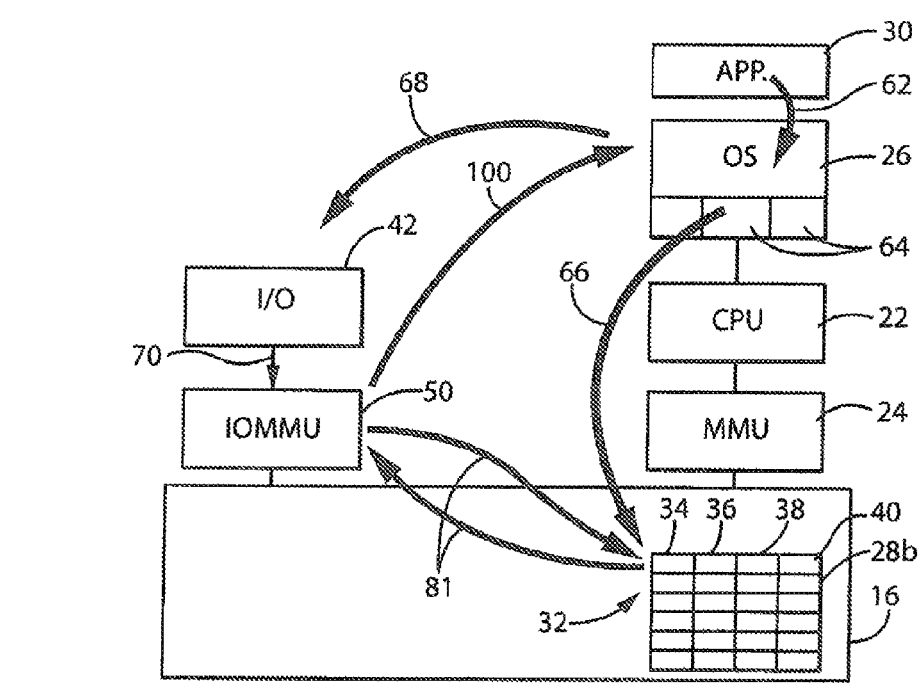
FIG. 2 is a data flow diagram showing the communication of information among the various components of FIG. 1 providing PTE removal by the IOMMU independent of the processor.

Referring now to FIG. 2, an application program 30 requiring access to data from an I/O device 42 may provide an API call 62 to the operating system 26. The operating system invokes a driver 64 associated with a particular I/O device 42, The driver 64 requests the OS to create a PTE 32 indicated by arrow 66 in the IOMMU-PT 28*b* providing virtual address 34, physical address 36 permissions 38 and removal rule 40 for use by the IOMMU 50 in mediating access between the I/O device 42 and the physical memory 16. This creation process is performed by the operating system 26 executing on a processor core 14 using permissions provided by the MMU 24 allowing access to the IOMMU-PT 28*b*.

The driver 64 may then instruct the I/O device 42 to provide the requested data through a write to physical memory 16, for example, by setting values in memory mapped registers or the like via bus structure 20 (shown in FIG. 1). The I/O device 42 then performs the desired operations, for example a disk read, port read, or the like, and provides a virtual address as indicated by arrow 70 to the IOMMU 50.

Figure 3:
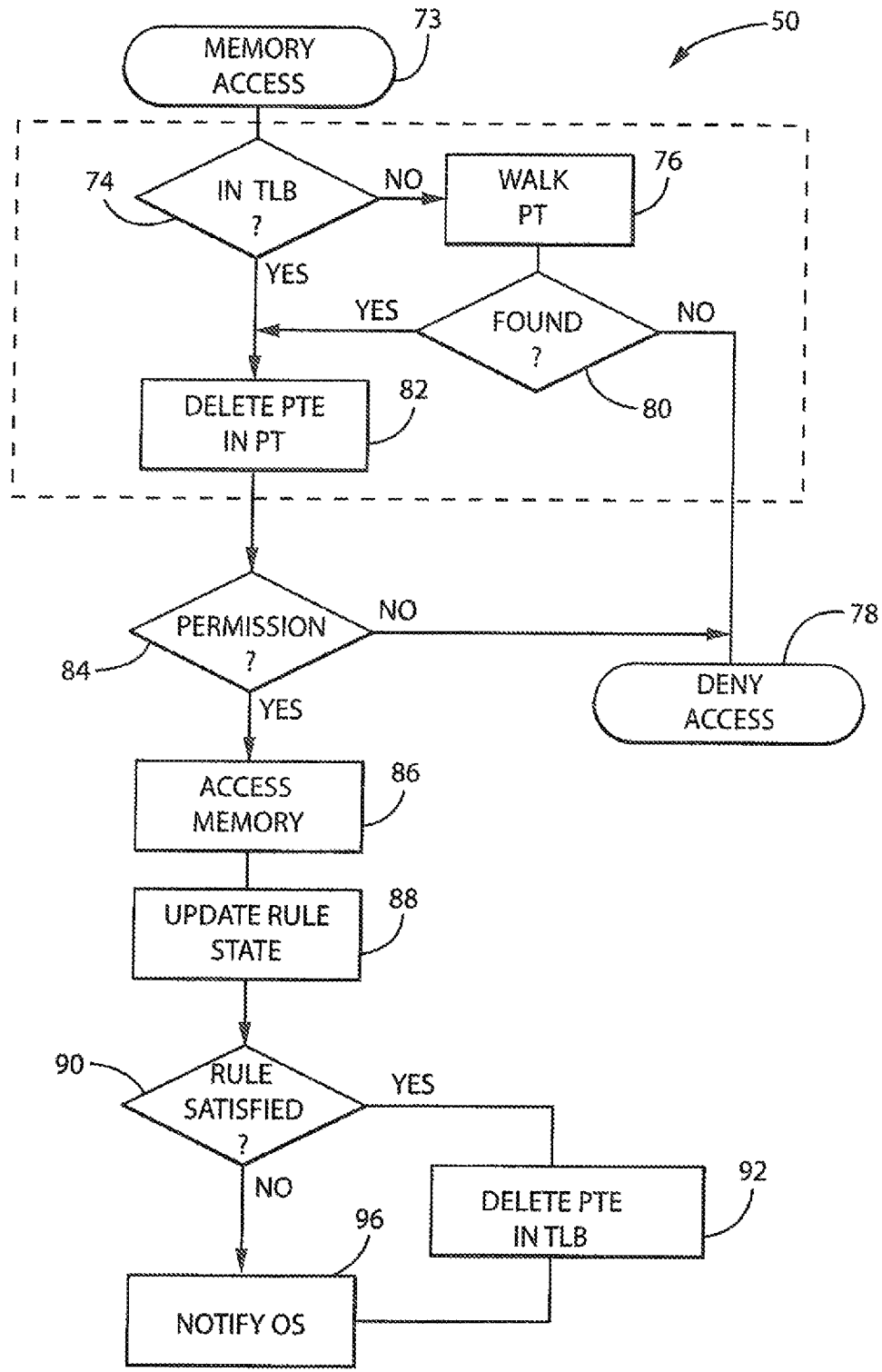
FIG. 3 is a flowchart of the operation of the I/O memory management unit in executing a memory transaction.

Referring now also to FIGS. 1, 2, 3, when the IOMMU 50 receives a request for memory access by I/O device 42 and a virtual address, as indicated by entry block 73, it checks the TLB 54, as indicated by decision block 74, for the desired virtual address range as held in a PTE 32 previously cached by the IOMMU 50 from the IOMMU-PT 28*b*. If an applicable PTE 32 is not available (meaning a PTE 32 having a having a virtual address matching that from the I/O device 42), the IOMMU 50 invokes the page table walker circuit 56, as indicated by process block 76, which scans through the IOMMU-PT 28 in a search process to determine, at decision block 80, whether the virtual address from the I/O device 42 is listed in any of the PTEs 32 in the IOMMU-PT 28*b* in the physical memory 16. This walking process is performed with one or more page accesses 81.

If an applicable PTE 32 is not found, the memory access requested by the I/O device 42 is denied as indicated by termination block 78, such as may also generate a fault transmitted to the operating system 26. On the other hand, if an applicable PTE 32 is found at decision block 80, the IOMMU 50 stores the necessary data in the TLB 54.

If an applicable PTE 32 is found. either as determined at decision block 80 or at decision block 74, the IOMMU 50 performs a deletion operation indicated by process block 82 deleting that PTE 32 from the IOMMU-PT 28*b* and eliminating the need for the processing unit 22 to do this in the future. Ideally this deletion process is performed shortly after reading of the PTE 32 so as to minimize the chance of erroneous memory accesses by other processes using the I/O device 42.

At succeeding decision block 84, permissions 38 for the applicable PTE 32 are checked to see if the requested memory access is permitted. If not, the access is again denied at termination block 78.

If an applicable PTE 32 is found with correct permissions, the IOMMU 50 proceeds to process block 86 and the access of physical memory 16 is performed. Assuming the access is complete, then at process block 88, the state of the removal rule 40 is updated. If, for example, the removal rule 40 provides for removal of the PTE 32 after a predetermined number of memory accesses, the state number contained in the removal rule 40 is decremented and tested against a condition of greater than zero. In this way, a removal rule 40 allowing two memory accesses to the physical memory 16 will be decremented to allow one access to physical memory 16. If the removal rule 40 provides for removal of the PTE 32 after a predetermined time, the recorded time of the rule 40 is compared against a current time (subtracted) and again tested against a condition of greater than zero. In this case no adjustment of the removal rule 40 state is required because it is referenced to an absolute time.

At decision block 90, if the condition of the removal rule 40 has been satisfied, the IOMMU 50 proceeds to process block 92 and simply deletes the PTE 32 in the TLB 54, having previously deleted the PTE 32 in the IOMMU-PT 28b at process block 82.

If the conditions of the removal rule 40 have not been satisfied at decision block 90, then the PTE as updated at process block 88 remains in the IOMMU-PT 28bAt process block 96, the IOMMU 50 provides a completion message 100 to the operating system 26 that the I/O memory transaction has been completed, for example, by setting of register flags and/or an interrupt of the control data structure portion of bus structure 20. At this point the processing unit 22 need not employ resources deleting entries in the IOMMU-PT 28b or in the TLB 54 greatly reducing the demand on the processing unit 22.

It will be noted that the process of deleting the PTE 32 in the IOMMU-PT 28b of physical memory of process block 82 may occur at various points in time in the process performed by the IOMMU 50, for example, occurring any time before process block 96. Desirably the deletion of process block 82 is performed atomically with the reading of the PTE 32 to prevent race problems.

During the time when the condition of the removal rule 40 of the PTE 32 has not yet been satisfied, the PTE 32 may be evicted from the TLB 54, for example, as a result of space constraints and incoming new PTE values. In these cases a writeback will be triggered, writing the value of PTE 32 back to the IOMMU-PT 28b.

For a page table entry to be "present" or "exist" in the TLB 54 or in the IOMMU-PT 28b it must refer to a logical condition and could refer to data actually held in these memory structures but marked as unavailable or expired. Thus "removal" of data may be accomplished marking the data as invalid. The term "table" is not intended to be limited to a particular form of data structure or organization of the data so long as linkage between the indicated data elements is logically provided. it will be appreciated that the present invention is compatible with cache structures working in conjunction with the physical memory which may be located before or after the MMU. Different arrangements of the I/O devices and IOMMU are contemplated, for example, with different IOMMU used for different I/O devices. The term CPU (central processing unit) is intended to refer generally to a functionally equivalent device including, for example, one core of a multicore microprocessor.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to he understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An input/output memory management unit (IOMMU) integrated circuit for use with a processor, the IOMMU comprising:
   an integrated circuit adapted for communicating with a translation table holding at least one page table entry mapping at least one virtual address to at least one physical address, the integrated circuit including:
   (a) input address lines for receiving virtual addresses from an I/O device;
   (b) output address lines for providing physical addresses to a physical memory;
   (c) data lines for communicating data between the I/O device and the physical memory; and
   (d) translation circuitry receiving a given virtual address from the input address lines and, only when an applicable page table entry is present in a translation table, translating the given virtual address to a given physical address at the output address lines according to the applicable page table entry and communicating data on the data lines related to the physical address in a data transaction;
   wherein the applicable page table entry is linked to a removal rule providing a condition for removal of the applicable page table entry from the translation table other than a need for additional space in the translation table and independent of a removal instruction by an operating system for the applicable page table entry and wherein the translation circuitry further responds to the removal rule to remove the applicable page table entry from the translation table when the condition is satisfied.

2. The IOMMU integrated circuit of claim 1 wherein the translation table includes a first portion and second portion and wherein the integrated circuit holds the first portion of the translation table and the second portion of the translation table is held in a memory external to the integrated circuit and wherein the first portion further holds multiple page table entries mapping different virtual addresses to different physical addresses and wherein the translation circuitry operates to remove the applicable page table entry from the first portion when the condition is satisfied.

3. The IOMMU integrated circuit of claim 2 wherein the translation circuitry operates so that when an applicable page table entry is not present in the first portion, an applicable page table entry is read from the second portion of the translation table held in memory external to the integrated circuit.

4. The IOMMU integrated circuit of claim 3 wherein the translation circuitry further removes the applicable page table entry from the second portion of the translation table held in memory external to the integrated circuit.

5. The IOMMU integrated circuit of claim 4 wherein the translation circuitry writes the applicable page table entry back to the second portion of the translation table when additional space is needed in the first portion of the translation table.

6. The IOMMU integrated circuit of claim 2 further including a page table walker for extracting page table entries from the second portion of the page table when the applicable page table entry is not initially found in the first portion so that the applicable page table entry is loaded into in the first portion.

7. The IOMMU integrated circuit of claim 1 wherein each page table entry further provides at least one permission indicating at least one of permission to read data at least one physical address and to write data at least one physical address.

8. The IOMMU integrated circuit of claim 1 wherein each page table entry provides at least one virtual address linked to at least one physical address and to one removal rule and wherein the applicable page table entry provides at least one virtual address mapping the given virtual address.

9. The IOMMU integrated circuit of claim 1 wherein the condition is an occurrence of a predetermined number of data transactions using the applicable page table entry.

10. The IOMMU integrated circuit of claim 9 wherein the predetermined number of data transactions is one.

11. The IOMMU integrated circuit of claim 1 wherein the condition is an occurrence of a predetermined amount of time selected from the group consisting of a time of existence of the applicable page table entry in the translation table and a time after last reference to the page table entry.

12. The IOMMU integrated circuit of claim 1 wherein the IOMMU provides control lines for communication of data directly with a processor without storage of the data in the physical memory.

13. The IOMMU integrated circuit of claim 1 further including control lines for communicating with a separate processor executing and operating system and wherein the translation circuitry communicates with the processor to provide a completion message indicating removal of the applicable page table entry when the page table entry has been removed.

14. A computer processor comprising:
a physical memory;
at least one processor communicating with the physical memory to access data within the physical memory executing an operating system;
a memory management unit (MMU) integrated circuit interposed between the physical memory and at least one processor, the MMU receiving virtual addresses from the processor for translation into physical addresses of the physical memory;
at least one I/O device communicating with the physical memory to access data within the physical memory; and
an I/O memory management unit (IOMMU) integrated circuit interposed between the physical memory and at least one I/O device, the IOMMU including:
(a) input address lines for receiving virtual addresses from an I/O device;
(b) output address lines for providing physical addresses to the physical memory;
(c) data lines for communicating data between the I/O device and the physical memory;
(d) a translation table holding at least one page table entry mapping at least one virtual address to at least one physical address; and
(e) translation circuitry receiving a given virtual address from the input address lines and, only when an applicable page table entry is present in the translation table, translating the given virtual address to a given physical address at the output address lines according to the applicable page table entry and communicating data on the data lines related to the physical address in a data transaction;
wherein the applicable page table entry is linked to a removal rule providing a condition for removal of the applicable page table entry from the translation table other than a need for additional space in the translation table and independent of a removal instruction by an operating system for the applicable page table entry and wherein the translation circuitry further responds to the removal rule to remove the applicable page table entry from the translation table when the condition is satisfied;
wherein the at least one processor executes the operating system to provide the data of page table entries in the translation table according to a driver of the at least one I/O device.

15. The computer system of claim 14 wherein at least one I/O device is a disk drive.

16. The computer system of claim 14 wherein at least one I/O device is a graphic processing unit.

17. The computer system of claim 14 wherein the translation circuitry further removes the applicable page table entry from a page table in the physical memory.

18. The computer system of claim 14 wherein the condition is an occurrence of a predetermined number of data transactions using the applicable page table entry.

19. The computer system of claim 14 wherein the condition is an occurrence of a predetermined amount of time of existence of the applicable page table entry in the translation table.

* * * * *